(12) United States Patent
Ma et al.

(10) Patent No.: US 8,349,458 B2
(45) Date of Patent: Jan. 8, 2013

(54) INTERLAYERS COMPRISING GLYCEROL BASED PLASTICIZER

(75) Inventors: Yinong Ma, Longmeadow, MA (US); Michael Walter Schultz, West Brookfield, MA (US); Jeffrey Benedict Hurlbut, West Springfield, MA (US); David Eric Allberry, Enfield, CT (US)

(73) Assignee: Solutia Inc., St. Louis, MO (US)

( * ) Notice: Subject to any disclaimer, the term of this patent is extended or adjusted under 35 U.S.C. 154(b) by 1075 days.

(21) Appl. No.: 11/936,041

(22) Filed: Nov. 6, 2007

(65) Prior Publication Data

US 2009/0118437 A1    May 7, 2009

(51) Int. Cl.
*B32B 17/10* (2006.01)
*B32B 27/42* (2006.01)
*C08K 5/103* (2006.01)

(52) U.S. Cl. ........ 428/426; 428/524; 524/310; 524/312; 427/389.7

(58) Field of Classification Search ............. 524/312, 524/310; 428/426, 524
See application file for complete search history.

(56) References Cited

U.S. PATENT DOCUMENTS

| | | | |
|---|---|---|---|
| 2,182,371 A | 12/1939 | Carver | |
| 2,184,423 A | 12/1939 | Gramkee | |
| 3,625,792 A * | 12/1971 | Shaffer | 156/214 |
| 3,657,057 A | 4/1972 | Shorr | |
| 3,998,792 A * | 12/1976 | Hermann et al. | 528/246 |
| 4,107,366 A | 8/1978 | Rieser | |
| 4,128,694 A | 12/1978 | Fabel | |
| 4,161,557 A | 7/1979 | Suzuki | |
| 4,251,591 A | 2/1981 | Chi | |
| 4,287,107 A | 9/1981 | Hermann | |
| 4,293,615 A | 10/1981 | Bowen | |
| 4,335,036 A | 6/1982 | Fowell | |
| 4,514,464 A | 4/1985 | Gomez | |
| 4,537,828 A | 8/1985 | Gomez | |
| 4,563,296 A | 1/1986 | Gomez | |
| 4,574,136 A | 3/1986 | Gomez | |
| 4,604,253 A | 8/1986 | Gomez | |
| 4,681,810 A | 7/1987 | Gomez | |
| 4,704,418 A | 11/1987 | Gomez | |
| 4,937,147 A | 6/1990 | Cartier | |
| 4,948,672 A | 8/1990 | Cartier | |
| 5,098,803 A * | 3/1992 | Monroe et al. | 430/1 |
| 6,720,082 B1 | 4/2004 | Hashimoto | |
| 6,921,509 B2 * | 7/2005 | Moran et al. | 264/173.16 |
| 2002/0048730 A1 | 4/2002 | Hatori | |
| 2003/0111159 A1 | 6/2003 | Hashimoto | |
| 2004/0254282 A1 | 12/2004 | Suzuki | |
| 2005/0136243 A1 | 6/2005 | Fisher | |
| 2005/0271982 A1 | 12/2005 | Setsuda | |
| 2007/0009714 A1 | 1/2007 | Lee | |
| 2007/0011863 A1 | 1/2007 | Yoshikawa | |
| 2007/0077411 A1 | 4/2007 | Hatta | |
| 2007/0128452 A1 | 6/2007 | Fisher | |
| 2007/0172642 A1 | 7/2007 | Fukatani | |
| 2008/0277045 A1 * | 11/2008 | Smith et al. | 156/106 |
| 2009/0277573 A1 * | 11/2009 | Choi et al. | 156/244.27 |

* cited by examiner

*Primary Examiner* — Tae H Yoon
(74) *Attorney, Agent, or Firm* — Lewis, Rice & Finersh, L.C.

(57) ABSTRACT

The present invention includes interlayers and multiple layer glazing panels comprising those interlayers, wherein the interlayers comprise poly(vinyl butyral) and a glycerol based plasticizer. The addition of the glycerol based plasticizer surprisingly results in a plasticized poly(vinyl butyral) layer that is suitable for use in a wide range of multiple layer glazing applications.

24 Claims, No Drawings

INTERLAYERS COMPRISING GLYCEROL BASED PLASTICIZER

FIELD OF THE INVENTION

The present invention is in the field of polymer layers and multiple layer glazing panels comprising poly(vinyl butyral), and, more specifically, the present invention is in the field of polymer layers and multiple layer glazing panels comprising plasticized poly(vinyl butyral).

BACKGROUND

Poly(vinyl butyral) (PVB) is commonly used in the manufacture of polymer layers that can be used as interlayers in light-transmitting laminates such as safety glass or polymeric laminates. Safety glass often refers to a transparent laminate comprising a poly(vinyl butyral) layer disposed between two layers of glass. Safety glass often is used to provide a transparent barrier in architectural and automotive openings. Its main function is to absorb energy, such as that caused by a blow from an object, without allowing penetration through the opening or the dispersion of shards of glass, thus minimizing damage or injury to the objects or persons within an enclosed area. Safety glass also can be used to provide other beneficial effects, such as to attenuate acoustic noise, reduce UV and/or IR light transmission, and/or enhance the appearance and aesthetic appeal of window openings.

Poly(vinyl butyral) can be plasticized with various plasticizing agents, including, for example, the commonly used triethylene glycol di-(2-ethylhexanoate). Other plasticizers can be used with poly(vinyl butyral) as well, with the desirability of the plasticizer determined by a combination of the cost, ease of use, and performance in the finished product.

Conventional plasticizers, while useful, can be comparatively expensive. Further, some plasticizers are difficult or hazardous to employ, or present undesirable disposal problems. Further improved plasticizers for use in poly(vinyl butyral) layers are therefore needed in the art.

SUMMARY OF THE INVENTION

The present invention includes interlayers and multiple layer glazing panels comprising those interlayers, wherein the interlayers comprise poly(vinyl butyral) and a glycerol based plasticizer. The addition of the glycerol based plasticizer surprisingly results in a plasticized poly(vinyl butyral) layer that is suitable for use in a wide range of multiple layer glazing applications.

DETAILED DESCRIPTION

The present invention involves glycerol plasticizing agents and their use in interlayers and multiple layer glazing panels comprising those interlayers. As used herein, a "multiple layer glazing interlayer" means an interlayer that can be used in a glazing having more than one layer, for example, two panes of glass with an interlayer therebetween. Interlayers of the present invention can consist of a single poly(vinyl butyral) layer or a poly(vinyl butyral) layer combined with one or more further polymer layers. Glazing panels can be used, for example, in automotive windshields and architectural applications. As disclosed herein, glycerol plasticizing agents are incorporated into polymer layers that are useful as interlayers or layers within interlayers for use in multiple layer glazing panel applications. As will be described in detail below, at least one polymer layer of the present invention comprises poly(vinyl butyral).

Glycerol plasticizing agents of the present invention are based on glycerol, which is shown in formula I:

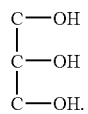

Formula I

Glycerol is a common organic compound that is available, for example, as a byproduct of biodiesel production and soap production. Glycerol plasticizing agents of the present invention can be fabricated from glycerol by, for example, reacting the glycerol with carboxylic acids in a condensation reaction to produce the desired agent. Of course, other suitable syntheses can be employed, and starting materials other than glycerol can be employed, as is useful.

Glycerol plasticizing agents of the present invention include those having the structure shown in formula II:

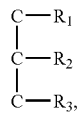

Formula II where $R_1$, $R_2$, and $R_3$ can be different or the same, and can be —OH or any carboxylic acid having the formula

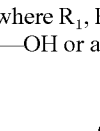

where $R_4$ is a hydrogen or a branched or straight chain aliphatic or aromatic hydrocarbon chain having from 3 to 14 or 3-9 carbons and wherein the sum of all carbons of $R_1$, $R_2$, and $R_3$ is 12 to 24. In various embodiments of the present invention, the sum of all carbons of $R_1$, $R_2$, and $R_3$ is 8-24, 12-24, 4-16, or 4-12.

In various embodiments of the present invention, $R_4$ is a heptyl, hexyl, pentyl, butyl, propyl, ethyl, or methyl group, although other straight and branched chain aliphatic and aromatic hydrocarbons can also be used. For the preceding list, the alkyl can be attached to the carbonyl carbon at any carbon in the alkyl group. For example, for pentyl, $R_4$ can be pentyl, 2-pentyl, 3 pentyl, and so on.

In various embodiments of the present invention, $R_1$, $R_2$, and $R_3$ are all

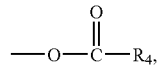

where $R_4$ is 3-heptyl to form glycerol tris(2-ethyl hexanoate), which has the structure shown in formula III:

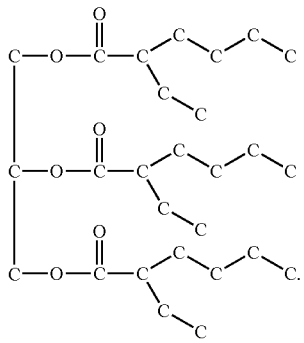

Formula III

In various embodiments, $R_1$, $R_2$, and $R_3$ are each butyrate, resulting in glycerol tributyrate.

In various embodiments of the present invention, one or two of $R_1$, $R_2$, and $R_3$ are —OH.

In any embodiments provided herein, a glycerol based plasticizer can be combined with a conventional plasticizer to form a plasticizer mixture. In these embodiments, the glycerol plasticizing agents of the present invention include those having the structure shown in formula II and the $R_1$, $R_2$, $R_3$ and $R_4$ values given above. In various embodiments of the present invention, a plasticizer mixture of the present invention comprises at least 5 weight percent, 20 weight percent, 50 weight percent, or 75 weight percent of a glycerol based plasticizer. In other embodiments, the glycerol based plasticizer can be from 2 to 99 weight percent, 5 to 99 weight percent, 5 to 50 weight percent, or 5 to 25 weight percent of the plasticizer mixture. In any of these embodiments, the conventional plasticizer can be any of those described below. In preferred embodiments, a glycerol plasticizer of the present invention is combined with triethylene glycol di-(2-ethylhexanoate), where weight percents of the glycerol plasticizer can be in the ranges given above in this paragraph. Two preferred combinations are: triethylene glycol di-(2-ethylhexanoate) and glycerol tributyrate, and triethylene glycol di-(2-ethylhexanoate) and glycerol tris(2-ethyl hexanoate).

Interlayers of the present invention that comprise a glycerol based plasticizer, either alone or in a mixture, can have 20 to 60, 25 to 60, 20 to 80, 10 to 70, or 10 to 100 parts plasticizer per hundred parts resin, on a weight basis.

Because of the greater compatibility with poly(vinyl butyral) of some glycerol tricarboxylate agents, the combination formulations can impart more flexibility in modifying performance attributes in the poly(vinyl butyral) interlayer products. For example, using poly(vinyl butyral) resin of higher residual poly(vinyl alcohol) percent or changing the performance range of interlayer products by incorporating more plasticizer.

In various embodiments, glycerol plasticizing agents are included in a poly(vinyl butyral) layer that is incorporated in an interlayer. In these embodiments, the interlayer can comprise only the single poly(vinyl butyral) layer, or can be a multiple layer interlayer comprising the poly(vinyl butyral) layer. Embodiments in which multiple layer interlayers are used include those that are known in the art, and include, for example and without limitation, interlayers having a poly(vinyl butyral) layer and one more other polymer layers laminated together to form a single interlayer, and interlayers having a poly(vinyl butyral) layer and one or more other polymer layers laminated together with one or more polymer films, which will be described in detail below. In any of these embodiments, glycerol plasticizing agents are included in at least one poly(vinyl butyral) layer, and optionally in others. The various layers in multiple layer interlayers can be the same or different.

Exemplary multiple layer interlayer constructs include the following:

(polymer layer)$_n$ (polymer layer/polymer film/polymer layer)$_p$ where n is 1 to 10 and, in various embodiments, is less than 5, and p is 1 to 5, and, in various embodiments, is less than 3, and wherein at least one of the polymer layers is a poly(vinyl butyral) layer having a glycerol plasticizer agent.

Interlayers of the present invention can be incorporated into multiple layer glazing panels, and, in various embodiments, are incorporated between two layers of glass. Applications for such constructs include automobile windshields and architectural glass, among others.

In other embodiments of the present invention, interlayers comprising poly(vinyl butyral) layers having a glycerol plasticizing agent are used in bilayers. As used herein, a bilayer is a multiple layer construct having a single rigid substrate, such as glass or acrylic, with an interlayer disposed thereon. A typical bilayer construct is: (glass)//(polymer layer)//(polymer film), where the polymer film supplies a smooth, thin, rigid substrate that affords better optical character than that usually obtained with a polymer layer alone. Bilayer constructs include, for example and without limitation:

(Glass)//((polymer layer)$_h$//(polymer film))$_g$ (Glass)//(polymer layer)$_h$//(polymer film)

where h is 1 to 10, and, in various embodiments is 1 to 3, and g is 1 to 5, and, in various embodiments, is 1 to 3, and wherein at least one of the polymer layers is a poly(vinyl butyral) layer having a glycerol plasticizer agent.

In further embodiment, interlayers as just described can be added to one side of a multiple layer glazing panel to act as a spall shield, for example and without limitation:

(Multiple Layer Glazing panel)//((polymer layer)$_h$//(polymer film))$_g$ (Multiple Layer Glazing panel)//(polymer layer)$_h$//(polymer film)

where h is 1 to 10, and, in various embodiments is 1 to 3, and g is 1 to 5, and, in various embodiments, is 1 to 3, and wherein at least one of the polymer layers is a poly(vinyl butyral) layer having a glycerol plasticizer agent with a total thickness of 0.1 to 2.5 millimeters.

Polymer Film

As used herein, a "polymer film" means a relatively thin and rigid polymer layer that functions as a performance enhancing layer. Polymer films differ from polymer layers, as used herein, in that polymer films do not themselves provide the necessary penetration resistance and glass retention properties to a multiple layer glazing structure, but rather provide performance improvements, such as infrared absorption character. Poly(ethylene terephthalate) is most commonly used as a polymer film.

In various embodiments, the polymer film layer has a thickness of 0.013 mm to 0.20 mm, preferably 0.025 mm to 0.1 mm, or 0.04 to 0.06 mm. The polymer film layer can optionally be surface treated or coated to improve one or more properties, such as adhesion or infrared radiation reflection. These functional performance layers include, for example, a multi-layer stack for reflecting infrared solar radiation and transmitting visible light when exposed to sunlight. This multi-layer stack is known in the art (see, for example, WO 88/01230 and U.S. Pat. No. 4,799,745) and can comprise, for example, one or more Angstroms-thick metal layers and one or more (for example two) sequentially deposited, optically cooperating dielectric layers. As is also known, (see, for example, U.S. Pat. Nos. 4,017,661 and 4,786,783), the metal layer(s) may optionally be electrically resistance heated for defrosting or defogging of any associated glass layers.

An additional type of polymer film that can be used with the present invention, which is described in U.S. Pat. No. 6,797,396, comprises a multitude of nonmetallic layers that function to reflect infrared radiation without creating interference that can be caused by metallic layers.

The polymer film layer, in some embodiments, is optically transparent (i.e. objects adjacent one side of the layer can be comfortably seen by the eye of a particular observer looking through the layer from the other side), and usually has a greater, in some embodiments significantly greater, tensile modulus regardless of composition than that of any adjacent polymer layer. In various embodiments, the polymer film layer comprises a thermoplastic material. Among thermoplastic materials having suitable properties are nylons, polyurethanes, acrylics, polycarbonates, polyolefins such as polypropylene, cellulose acetates and triacetates, vinyl chloride polymers and copolymers, and the like. In various embodiments, the polymer film layer comprises materials such as re-stretched thermoplastic films having the noted properties, which include polyesters, for example poly(ethylene terephthalate) and poly(ethylene terephthalate) glycol (PETG). In various embodiments, poly(ethylene terephthalate) is used, and, in various embodiments, the poly(ethylene terephthalate) has been biaxially stretched to improve strength, and has been heat stabilized to provide low shrinkage characteristics when subjected to elevated temperatures (e.g. less than 2% shrinkage in both directions after 30 minutes at 150° C.).

Various coating and surface treatment techniques for poly (ethylene terephthalate) film that can be used with the present invention are disclosed in published European Application No. 0157030. Polymer films of the present invention can also include a hardcoat and/or and antifog layer, as are known in the art.

Polymer Layer

The following section describes the various materials, such as poly(vinyl butyral), that can be used to form polymer layers of the present invention. This section applies in its entirety to polymer layers lacking glycerol plasticizers that are used in multiple layer interlayers. For polymer layers that are the poly(vinyl butyral) layers with a glycerol plasticizing agent, this section applies to the extent that it does not conflict with the description given elsewhere herein specifically for poly (vinyl butyral) layers comprising a glycerol plasticizing agent.

As used herein, a "polymer layer" means any thermoplastic polymer composition formed by any suitable method into a thin layer that is suitable alone, or in stacks of more than one layer, for use as an interlayer that provides adequate penetration resistance and glass retention properties to laminated glazing panels. Plasticized poly(vinyl butyral) is most commonly used to form polymer layers.

As used herein, "resin" refers to the polymeric (for example poly(vinyl butyral)) component that is removed from the mixture that results from the acid catalysis and subsequent neutralization of the polymeric precursors. Resin will generally have other components in addition to the polymer, such as acetates, salts, and alcohols. As used herein, "melt" refers to a melted mixture of resin with a plasticizer and, optionally, other additives.

The polymer layers of the present invention can comprise any suitable polymer, and, in a preferred embodiment, as exemplified above, the polymer layer comprises poly(vinyl butyral). In any of the embodiments of the present invention given herein that comprise poly(vinyl butyral) as the polymeric component of the polymer layer, another embodiment is included in which the polymer component consists of or consists essentially of poly(vinyl butyral). In these embodiments, any of the variations in additives, including plasticizers, disclosed herein can be used with the polymer layer having a polymer consisting of or consisting essentially of poly(vinyl butyral).

In one embodiment, the polymer layer comprises a polymer based on partially acetalized poly(vinyl alcohol)s. In another embodiment, the polymer layer comprises a polymer selected from the group consisting of poly(vinyl butyral), polyurethane, poly(vinyl chloride), poly(ethylene vinyl acetate), combinations thereof, and the like. In further embodiments the polymer layer comprises poly(vinyl butyral) and one or more other polymers. Other polymers having a suitable glass transition temperature can also be used. In any of the sections herein in which preferred ranges, values, and/or methods are given specifically for poly(vinyl butyral) (for example, and without limitation, for plasticizers, component percentages, thicknesses, and characteristic-enhancing additives), those ranges also apply, where applicable, to the other polymers and polymer blends disclosed herein as useful components in polymer layers.

For embodiments comprising poly(vinyl butyral), the poly (vinyl butyral) can be produced by known acetalization processes, as are known to those skilled in the art (see, for example, U.S. Pat. Nos. 2,282,057 and 2,282,026). In one embodiment, the solvent method described in Vinyl Acetal Polymers, in Encyclopedia of Polymer Science & Technology, $3^{rd}$ edition, Volume 8, pages 381-399, by B. E. Wade (2003) can be used. In another embodiment, the aqueous method described therein can be used. Poly(vinyl butyral) is commercially available in various forms from, for example, Solutia Inc., St. Louis, Mo. as Butvar™ resin.

As used herein, residual hydroxyl content (as weight percent hydroxyl groups calculated as poly(vinyl alcohol) (PVOH)) refers to the amount of hydroxyl groups remaining as side groups on the polymer chains after processing is complete. For example, poly(vinyl butyral) can be manufactured by hydrolyzing poly(vinyl acetate) to poly(vinyl alcohol), and then reacting the poly(vinyl alcohol) with butyraldehyde to form poly(vinyl butyral). In the process of hydrolyzing the poly(vinyl acetate), typically not all of the acetate side groups are converted to hydroxyl groups. Further, reaction with butyraldehyde typically will not result in all hydroxyl groups being converted to acetal groups. Consequently, in any finished poly(vinyl butyral), there will typically be residual acetate groups (as vinyl acetate groups) and residual hydroxyl groups (as vinyl hydroxyl groups) as side groups on the polymer chain. As used herein, residual hydroxyl content is measured on a weight percent basis per ASTM 1396.

In various embodiments, the polymer layer resin comprising poly(vinyl butyral) comprises 10 to 35 weight percent (wt. %) hydroxyl groups calculated as poly(vinyl alcohol), 13 to 30 wt. % hydroxyl groups calculated as poly(vinyl alcohol), or 15 to 22 wt. % hydroxyl groups calculated as poly (vinyl alcohol). The polymer layer resin can also comprise less than 15 wt. % residual ester groups, 13 wt. %, 11 wt. %, 9 wt. %, 7 wt. %, 5 wt. %, or less than 3 wt. % residual ester groups calculated as polyvinyl acetate, with the balance being an acetal, preferably butyraldehyde acetal, but optionally including other acetal groups in a minor amount, for example, a 2-ethyl hexanal group (see, for example, U.S. Pat. No. 5,137,954).

In various embodiments, the polymer layer comprises poly (vinyl butyral) having a molecular weight at least 30,000, 40,000, 50,000, 55,000, 60,000, 65,000, 70,000, 120,000, 250,000, or at least 350,000 grams per mole (g/mole or Daltons). Small quantities of a dialdehyde or trialdehyde can also be added during the acetalization step to increase molecular weight to at least 350,000 grams per mole (see, for example, U.S. Pat. Nos. 4,902,464; 4,874,814; 4,814,529; and, 4,654,179). As used herein, the term "molecular weight" means the weight average molecular weight.

Various adhesion control agents can be used in polymer layers of the present invention, including sodium acetate, potassium acetate, and magnesium salts. Magnesium salts that can be used with these embodiments of the present invention include, but are not limited to, those disclosed in U.S. Pat. No. 5,728,472, such as magnesium salicylate, magnesium nicotinate, magnesium di-(2-aminobenzoate), magnesium di-(3-hydroxy-2-napthoate), and magnesium bis(2-ethyl butyrate)(chemical abstracts number 79992-76-0). In various embodiments of the present invention the magnesium salt is magnesium bis(2-ethyl butyrate).

Other additives may be incorporated into the polymer layer to enhance its performance in a final product. Such additives include, but are not limited to, dyes, pigments, stabilizers (e.g., ultraviolet stabilizers), antioxidants, antiblock agents, additional IR absorbers, flame retardants, combinations of the foregoing additives, and the like, as are known in the art.

In various embodiments of polymer layers of the present invention, polymer layers can comprise 20 to 60, 25 to 60, 20 to 80, 10 to 70, or 10 to 100 parts plasticizer phr. Of course other quantities can be used as is appropriate for the particular application. In some embodiments, the plasticizer has a hydrocarbon segment of fewer than 20, fewer than 15, fewer than 12, or fewer than 10 carbon atoms.

As used herein, the amount of plasticizer, or any other component in a polymer layer, can be measured as parts per hundred resin (phr) parts, on a weight per weight basis. For example, if 30 grams of plasticizer is added to 100 grams of polymer resin, then the plasticizer content of the resulting plasticized polymer would be 30 phr. As used herein throughout, when the plasticizer content of a polymer layer is given, the plasticizer content of that particular polymer layer is determined with reference to the phr of the plasticizer in the melt that was used to produce that particular layer.

The amount of plasticizer in these layers can be adjusted to affect the glass transition temperature ($T_g$) of the poly(vinyl butyral) layer. In general, higher amounts of plasticizer are added to decrease the $T_g$. Poly(vinyl butyral) polymer layers of the present invention can have a $T_g$ of 40° C. or less, 35° C. or less, 30° C. or less, 25° C. or less, 20° C. or less, and 15° C. or less.

Suitable plasticizers for use in these layers include esters of a polybasic acid or a polyhydric alcohol, among others. Suitable plasticizers include, for example, triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as the oil-modified sebacic alkyds, mixtures of phosphates and adipates such as disclosed in U.S. Pat. No. 3,841,890, adipates such as disclosed in U.S. Pat. No. 4,144, 217, and mixtures and combinations of the foregoing. Other plasticizers that can be used are mixed adipates made from $C_4$ to $C_9$ alkyl alcohols and cyclo $C_4$ to $C_{10}$ alcohols, as disclosed in U.S. Pat. No. 5,013,779, and $C_6$ to $C_8$ adipate esters, such as hexyl adipate. In various embodiments, the plasticizer used is triethylene glycol di-(2 ethylhexanoate).

The poly(vinyl butyral) polymer, plasticizer, and any additives can be thermally processed and configured into layer form according to methods known to those of ordinary skill in the art. One exemplary method of forming a poly(vinyl butyral) layer comprises extruding molten poly(vinyl butyral) comprising resin, plasticizer, and additives by forcing the melt through a die (for example, a die having an opening that is substantially greater in one dimension than in a perpendicular dimension). Another exemplary method of forming a poly(vinyl butyral) layer comprises casting a melt from a die onto a roller, solidifying the resin, and subsequently removing the solidified resin as a layer. In various embodiments, the polymer layers can have thicknesses of, for example, 0.1 to 2.5 millimeters, 0.2 to 2.0 millimeters, 0.25 to 1.75 millimeters, and 0.3 to 1.5 millimeters.

In various embodiments of the present invention, two or more polymer layers are formed into an interlayer through coextrusion, which is a process in which two or more polymer melts are extruded at the same time to form a multiple layer interlayer with two or more adjacent polymer layers in contact with each other without the need for a later lamination step. For each interlayer embodiment of the present invention in which two or more separate polymer layers are disposed in contact with one another and subsequently laminated into a single interlayer, there also exists an embodiment where a coextruded interlayer is formed to have the same layer arrangement, which, as used herein, is considered to be formed of individual polymer layers and is considered a "multiple layer" interlayer.

For each embodiment described above comprising a glass layer, another embodiment exists, where suitable, wherein a non-glass glazing type material is used in place of the glass. Examples of such glazing layers include rigid plastics having a high glass transition temperature, for example above 60° C. or 70° C., for example polycarbonates and polyalkyl methacrylates, and specifically those having from 1 to 3 carbon atoms in the alkyl moiety.

Also included in the present invention are stacks or rolls of any of the polymer layers and interlayers of the present invention disclosed herein in any combination.

The present invention also includes windshields, windows, and other finished glazing products comprising any of the interlayers of the present invention.

The present invention includes methods of manufacturing interlayers and glazing panels comprising forming an interlayer or glazing panel of the present invention using any of the polymer layers of the present invention described herein.

The present invention further includes a method of manufacturing a polymer layer, comprising mixing an glycerol plasticizing agent with a poly(vinyl butyral) resin to form a melt, and then forming a polymer layer from the melt.

The present invention includes a method of forming a multiple layer glazing interlayer, comprising the steps of heating a poly(vinyl butyral) resin to a molten state; adding a glycerol plasticizer of the present invention to form a melt, and, forming said melt into said interlayer through any suitable means, such as by extruding or casting the melt.

As used herein, a "hydrocarbon" is a molecule or part of a molecule that consists of only carbons and hydrogens.

Various polymer layer and/or laminated glass characteristics and measuring techniques will now be described for use with the present invention.

The clarity of a polymer layer can be determined by measuring the haze value, which is a quantification of the scattered light by a sample in contrast to the incident light. The percent haze can be measured according to the following technique. An apparatus for measuring the amount of haze, a Hazemeter, Model D25, which is available from Hunter Associates (Reston, Va.), can be used in accordance with ASTM D1003-61 (Re-approved 1977)-Procedure A, using Illuminant C, at an observer angle of 2 degrees. In various embodiments of the present invention, percent haze is less than 5%, less than 3%, and less than 1%.

Pummel adhesion can be measured according to the following technique, and where "pummel" is referred to herein to quantify adhesion of a polymer layer to glass, the following technique is used to determine pummel. Two-ply glass laminate samples are prepared with standard autoclave lamination conditions. The laminates are cooled to about −17° C. (0° F.) and manually pummeled with a hammer to break the glass. All broken glass that is not adhered to the poly(vinyl butyral) layer is then removed, and the amount of glass left adhered to the poly(vinyl butyral) layer is visually compared with a set of standards. The standards correspond to a scale in which varying degrees of glass remain adhered to the poly(vinyl butyral) layer. In particular, at a pummel standard of zero, no glass is left adhered to the poly(vinyl butyral) layer. At a pummel standard of 10, 100% of the glass remains adhered to the poly(vinyl butyral) layer. For laminated glass panels of the present invention, various embodiments have a pummel of at least 3, at least 5, at least 8, at least 9, or 10. Other embodiments have a pummel between 8 and 10, inclusive.

The "yellowness index" of a polymer layer can be measured according to the following: Transparent molded disks of polymer layer 1 cm thick, having smooth polymeric surfaces which are essentially plane and parallel, are formed. The index is measured according to ASTM method D 1925, "Standard Test Method for Yellowness Index of Plastics" from spectrophotometric light transmittance in the visible spectrum. Values are corrected to 1 cm thickness using measured specimen thickness.

EXAMPLES

Example 1

100 parts of a poly(vinyl butyral) resin (18.7% residual hydroxyl content) is combined with 30 parts of glycerol tris (2-ethylhexanoate) plasticizer. The resin and plasticizer are heated and mixed to form a melt, which is then formed into a sheet with a $T_g$ of 38° C.

Example 2

100 parts of poly(vinyl butyral) resin (18.7% residual hydroxyl content) is combined with 35 parts of glycerol tris (2-ethylhexanoate) plasticizer. The resin and plasticizer are heated and mixed to form a melt, which is then formed into a sheet with $T_g$ of 33° C. Beyond this loading, exudation of the said plasticizer prevents a stable formulation.

Example 3

100 parts of poly(vinyl butyral) resin (18.7% residual hydroxyl content) is combined with 50 parts of glycerol tributyrate plasticizer. The resin and plasticizer are heated and mixed to form a melt, which is then formed into a sheet with a $T_g$ of 20° C.

Example 4

100 parts of poly(vinyl butyral) resin (18.7% residual hydroxyl content) is combined with 60 parts of glycerol tributyrate plasticizer. The resin and plasticizer are heated and mixed to form a melt, which is then formed into a sheet with a $T_g$ of 16° C.

Example 5

100 parts of poly(vinyl butyral) resin (18.7% residual hydroxyl content) is combined with 70 parts of glycerol tributyrate plasticizer. The resin and plasticizer are heated and mixed to form a melt, which is then formed into a sheet with a $T_g$ of 13° C.

Example 6

100 parts of poly(vinyl butyral) resin (16% residual hydroxyl content) is combined with 60 parts of glycerol tributyrate plasticizer. The resin and plasticizer are heated and mixed to form a melt, which is then formed into a sheet with a $T_g$ of 11° C.

Example 7

100 parts of poly(vinyl butyral) resin (16% residual hydroxyl content) is combined with 70 parts of glycerol tributyrate plasticizer. The resin and plasticizer are heated and mixed to form a melt, which is then formed into a sheet with a $T_g$ of 6° C.

Example 8

100 parts of poly(vinyl butyral) resin (16% residual hydroxyl content) is combined with 80 parts of glycerol tributyrate plasticizer. The resin and plasticizer are heated and mixed to form a melt, which is then formed into a sheet with a $T_g$ of 3° C.

Example 9

100 parts of poly(vinyl butyral) resin (18.7% residual hydroxyl content) is combined with 38 parts of triethylene glycol di-(2-ethylhexanoate) plasticizer and 14 parts of glycerol tributyrate plasticizer. The resin and plasticizer are heated and mixed to form a melt, which is then formed into a sheet with a $T_g$ of 21.5° C.

Example 10

100 parts of poly(vinyl butyral) resin (18.7% residual hydroxyl content) is combined with 26 parts of triethylene glycol di-(2-ethylhexanoate) plasticizer and 26 parts of glycerol tributyrate plasticizer. The resin and plasticizer are heated and mixed to form a melt, which is then formed into a sheet with a $T_g$ of 21.5° C.

Example 11

An exudation test is performed on the sheets formed in Examples 1 through 10. Each sheet is hung in the air for several weeks and then visually inspected for plasticizer exudation. No exudation is observed for any of the samples.

By virtue of the present invention, it is now possible to provide interlayers comprising poly(vinyl butyral) layers that are plasticized with glycerol plasticizing agents, which are surprisingly effective and which are economical to use.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, and that the invention will include all embodiments falling within the scope of the appended claims.

It will further be understood that any of the ranges, values, or characteristics given for any single component of the present invention can be used interchangeably with any ranges, values, or characteristics given for any of the other components of the invention, where compatible, to form an embodiment having defined values for each of the components, as given herein throughout. For example, a polymer layer can be formed comprising poly(vinyl butyral) having a residual hydroxyl content in any of the ranges given in addition to comprising glycerol plasticizer agents in any of the ranges given, where appropriate, to form many permutations that are within the scope of the present invention, but that would be cumbersome to list. Further, ranges provided for a genus or a category, such as glycerol plasticizer agents, can also be applied to species within the genus or members of the category, such as glycerol tris(2-ethylhexanoate), unless otherwise noted.

Any figure reference numbers given within the abstract or any claims are for illustrative purposes only and should not be construed to limit the claimed invention to any one particular embodiment shown in any figure.

Figures are not drawn to scale unless otherwise indicated.

Each reference, including journal articles, patents, applications, and books, referred to herein is hereby incorporated by reference in its entirety.

We claim:

1. A multiple layer glazing interlayer, comprising:
a polymer layer comprising
poly(vinyl butyral); and,
a first plasticizer having the formula

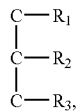

where $R_1$, $R_2$, and $R_3$ can be different or the same, and can be —OH or

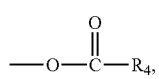

where $R_4$ is a hydrogen or a branched or straight chain aliphatic or aromatic hydrocarbon chain having from 3 to 14 carbons and wherein the sum of all carbons of $R_1$, $R_2$ and $R_3$ is 4 to 24.

2. The interlayer of claim 1, wherein the sum of all carbons of $R_1$, $R_2$, and $R_3$ is 8 to 24.

3. The interlayer of claim 1, wherein the sum of all carbons $R_1$, $R_2$, and $R_3$ is 12 to 24.

4. The interlayer of claim 1, wherein the sum of all carbons of $R_1$, $R_2$, and $R_3$ is 4 to 16.

5. The interlayer of claim 1, wherein the sum of all carbons of $R_1$, $R_2$, and $R_3$ is 4 to 12.

6. The interlayer of claim 1, wherein $R_4$ has 3 to 9 carbons for each of $R_1$, $R_2$, and $R_3$.

7. The interlayer of claim 1, wherein said first plasticizer has the formula:

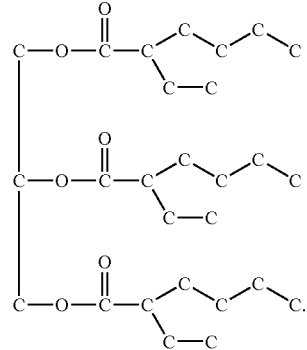

8. The interlayer of claim 1, wherein said interlayer further comprises a second plasticizer, wherein said first plasticizer is 2 to 99 weight percent of a plasticizer mixture of said first and said second plasticizer.

9. The interlayer of claim 8, wherein said first plasticizer is 5 to 25 weight percent of said plasticizer mixture.

10. The interlayer of claim 8, wherein said first plasticizer is glycerol tributyrate, and said second plasticizer is triethylene glycol di-(2-ethylhexanoate).

11. The interlayer of claim 8, wherein said second plasticizer is triethylene glycol di-(2-ethylhexanoate).

12. A multiple layer glazing comprising:
a multiple layer glazing interlayer, comprising:
a polymer layer comprising:
poly(vinyl butyral); and,
a first plasticizer having the formula

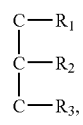

where $R_1$, $R_2$, and $R_3$ can be different or the same, and can be —OH or

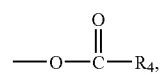

where $R_4$ is a hydrogen or a branched or straight chain aliphatic or aromatic hydrocarbon chain having from 3 to 14 carbons and wherein the sum of all carbons of $R_1$, $R_2$, and $R_3$ is 4 to 24.

13. The glazing of claim 12, wherein the sum of all carbons of $R_1$, $R_2$, and $R_3$ is 8 to 24.

14. The glazing of claim 12, wherein the sum of all carbons of $R_1$, $R_2$, and $R_3$ is 12 to 24.

15. The glazing of claim 12, wherein the sum of all carbons of $R_1$, $R_2$, and $R_3$ is 4 to 16.

16. The glazing of claim 12, wherein the sum of all carbons of $R_1$, $R_2$, and $R_3$ is 4 to 12.

17. The glazing of claim 12, wherein $R_4$ has 3 to 9 carbons for each of $R_1$, $R_2$, and $R_3$.

18. The glazing of claim 12, wherein said first plasticizer has the formula:

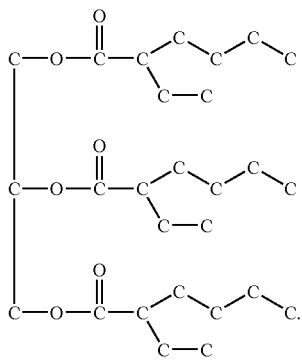

19. The glazing of claim 12, wherein said interlayer further comprises a second plasticizer, wherein said first plasticizer is 2 to 99 weight percent of a plasticizer mixture of said first and said second plasticizer.

20. The glazing of claim 19, wherein said first plasticizer is 5 to 99 weight percent of said plasticizer mixture.

21. The glazing of claim 19, wherein said first is glycerol tributyrate, and said second plasticizer is triethylene glycol di-(2-ethylhexanoate).

22. The glazing of claim 19, wherein said second plasticizer is triethylene glycol di-(2-ethylhexanoate).

23. A method of forming a multiple layer glazing interlayer, comprising:
heating a poly(vinyl butyral) resin to a molten state;
adding a first plasticizer having the formula

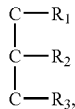

where $R_1$, $R_2$, and $R_3$ can be different or the same, and can be —OH or

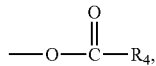

where $R_4$ is a hydrogen or a branched or straight chain aliphatic or aromatic hydrocarbon chain having from 3 to 14 carbons and wherein the sum of all carbons $R_1$, $R_2$, and $R_3$ is 4 to 24, to form a melt; and,
forming said melt into said interlayer.

24. The method of claim 23 further comprising:
adding a second plasticizer to said melt before forming said melt into said interlayer.

* * * * *